Dec. 15, 1925.                                            1,565,365
J. F. HIDZICK
FISH WASHING TANK
Filed April 6, 1925
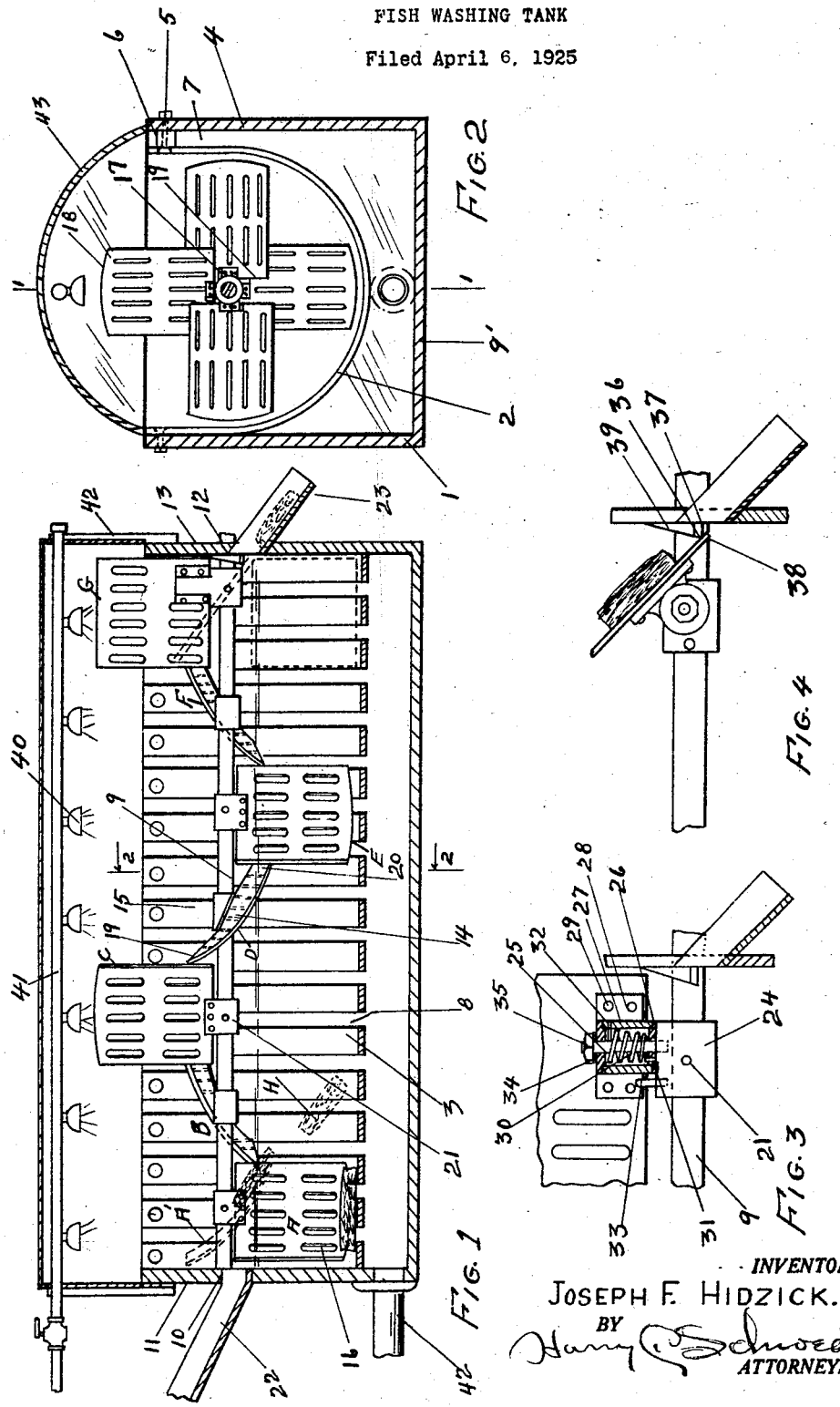
INVENTOR.
JOSEPH F. HIDZICK.
BY
Harry C. Schroeder
ATTORNEYS.

Patented Dec. 15, 1925.

1,565,365

UNITED STATES PATENT OFFICE.

JOSEPH F. HIDZICK, OF SAN FRANCISCO, CALIFORNIA.

FISH-WASHING TANK.

Application filed April 6, 1925. Serial No. 20,962.

*To all whom it may concern:*

Be it known that I, JOSEPH F. HIDZICK, a citizen of the United States, residing at San Francisco, in the county of San Francisco and State of California, have invented certain new and useful Improvements in Fish-Washing Tanks, of which the following is a specification.

My invention is a washing tank for washing cleaned fish in order to thoroughly remove any of the entrails which may be left after gutting the fish, and to subject them to a paddling operation in order to assist in a thorough cleansing of the fish. My invention comprises a tank having an inner foraminated or open body in which the fish are subjected to the washing operation so that the dirt or the like will settle to the bottom of the tank. A shaft extends lengthwise of the tank and carries a series of perforated paddles adapted to pick up the fish from the bottom of the foraminated inner body, raise it part way and allow the fish to slip or plunge into the water. The paddles are so arranged that they convey the fish from the feeding in end to the feeding out end.

My invention comprehends the special manner of shaping and mounting the paddles and the use of a tilting paddle at the feed out end to elevate a fish from the washing tank and discharge it on a chute. While the fish are being drawn through the water in the tank they are subjected to a rubbing action against the forminated grate and when the fish are elevated above the surface of the water they are subjected to water sprays.

My invention will be more readily understood from the following description and drawings in which Figure 1 is a longitudinal section of the cleaning tank on the line 1—1 of Figure 2, with the paddles or blades shown full and the tank and inner grating in section.

Figure 2 is a cross-section of Figure 1 on the line 2—2 in the direction of the arrow, showing a convenient spacing of the blades or paddles around the shaft.

Figure 3 is an enlarged vertical section taken longitudinally to illustrate the mounting of the tilting paddle at the feed out end.

Figure 4 is a section similar to Figure 3, showing the cam for tilting the paddle.

Referring particularly to Figures 1 and 2, a tank 1 which may be of any suitable shape, preferably rectangular, has an inner grating or foraminated body 2 preferably cylindrical in shape at the bottom. A convenient way to make this grating is to curve a series of strips 3 and attach them to the vertical walls 4 of the tank, by means of bolts or screws 5 with a separating washer 6 to space the grating from the walls of the tank, as indicated at 7. The strips 3 would be spaced a sufficient distance 8 apart to allow the dirt or the like to settle to the bottom 9 of the tank.

A shaft 9′ extends longitudinally from end to end of the tank and is journaled in bearings 10 at the feed in end 11 and 12 at the discharge end 13. This shaft is driven by any suitable power not shown. A series of fixed paddles 14 are mounted on the shaft 9, preferably by hubs 15. These paddles are curved in the form of a scoop as shown at paddle D in Figure 1, facing towards the reader and paddles B and F facing away from the reader in Figure 1. The paddles A and D are represented as at the bottom of the tank and C and G as in the upper position. These paddles have longitudinal slots 16 or other perforations to allow the water to pass freely through. The paddles may have the same curvature from their inner ends 17 to the outer ends 18 with the sides 19 leading and 20 trailing formed parallel: or these paddles may be formed of a varying curvature from their inner to outer ends and with the sides not parallel. The hubs may be attached to the shaft by any suitable means such as a set screw 21 or other suitable clamping device which will allow the blades to be shifted around the shaft relative one to the other.

In the position shown, the fish would be fed in one by one at the chute 22 or a suitable hopper, preferably feeding a fish just as the paddle A was rising, the chute being situated on the near side of the tank, as illustrated in Figure 1. On account of the scoop-shape or the inclination of the blades, the fish will readily slip off the blade as it approaches a horizontal position, as indicated by the dotted blade A′. A fish slipping off the blade as indicated by H will be picked up from the bottom of the grating by the blades or paddles B or C. These paddles can be sufficient in number to keep the fish in continuous movement or agitation.

The feeding out paddle G is preferably mounted to have normally a substantially horizontal position in order to raise the fish to discharge at the outlet chute 23. The details of the mounting of this blade or paddle are shown particularly in Figures 3 and 4. A hub 24 is preferably secured to the shaft 9 by set-screw 21 or the like and has a pin 25 firmly secured to the hub. A plate 26 is secured to the hub and a sleeve 27 is secured to the blade G by means of flanges 28, with suitable bolts or rivets 29. A helical coil spring 30 encircles the pin 25 and has one end extending into a socket 31 in the plate 26 and the other end inserted in a hole 32 in the sleeve 27. In this manner the spring is tensioned between the hub and the sleeve in order to normally hold the blade against a stop-pin 33 attached to the hub 24. A cap-plate 34 fits over the end of the sleeve 27 and is clamped by a nut 35 on the screw-threaded end of the pin 25. This holds the blade or paddle G in close engagement with the hub 24 and causes it to rotate therewith. This construction of the sleeve with the plate and cap at each end keep the spring from becoming clogged with any dirt.

The blade G is caused to tilt from its horizontal position in rising in the tank to an inclined position, as shown in Figure 4, to discharge a fish by means of a cam 36 having a square end 37 at the bottom to engage the edge 38 of the paddle G. This cam is secured to the discharge end 13 of the tank. The upper inclined cam surface 39 is to allow the blade G to slip back to its normal, that is, with both edges substantially radial to the main shaft, it being returned to this position by the spring 30.

The fish are sprayed by a series of water jets 40 in a horizontal pipe 41, supported by brackets 42, inside the hood 43, or the pipe 41 may be mounted directly inside the upper portion of the hood and supported by the end walls thereof. A hood would preferably be semi-circular as shown in Figure 2. The water will be maintained in the tank to the level of the discharge chute 23 being substantially as shown by the dotted lines W. L. The pipe 42 is used for drainage to clean out the tank when desired, or it may be used continuously to have a continuous flow of water therethrough.

The operation of my fish washer it is believed will be obvious from the above description, the fish being fed in at the one end, lifted and dropped by the paddles, continually advanced along the grating, and lifted and discharged by the tilting paddle G. My invention may be considerably changed or modified without departing from the spirit thereof.

Having described my invention what I claim is:—

1. A fish washing tank comprising in combination a tank, a shaft extending therethrough, a series of inclined paddles attached to said shaft and a lifting paddle at the discharge end having means for tilting the paddle at a predetermined point associated therewith.

2. A fish washing tank comprising in combination a tank, a foraminated grating in said tank, a shaft extending longitudinally of the tank and grating, a series of paddles attached to the shaft, a discharge chute and a discharge paddle secured to the shaft adapted to lift and discharge fish through the said chute.

3. A fish washing tank as claimed in claim 2, in which the latter paddle is mounted with freedom of tilting motion on a radial axis and has a cam co-operating therewith for tilting the same at a predetermined point.

4. A fish washing tank comprising in combination a tank, an inner grating supported thereby, said grating being substantially semi-circular in cross section at its lower position and having a series of transverse openings, a shaft extending longitudinally of the grating and tank, a plurality of perforated paddles secured to said shaft, said paddles being inclined to feed a fish or the like from the feeding in to the discharge end of the tank, a discharge opening in the tank and a discharge paddle adapted to lift the fish to said discharge opening.

5. A washing tank for fish or the like as claimed in claim 4, in which the discharge paddle is mounted with freedom of tilting motion on a radial axis and has means co-operating therewith for effecting such tilting motion at a predetermined point.

6. A washing tank for fish or the like, comprising in combination a tank structure of considerable longitudinal length compared with its width, a longitudinal grating supported thereby, said grating being constructed of a plurality of strips supported from the walls of the tank, a shaft extending longitudinally of the tank and grating, a series of perforated, inclined paddles attached to said shaft, said paddles being scoop shaped and inclined to feed a fish from the inlet to discharge end of the tank, openings in the ends of the tank forming feeding and discharge passages for fish and a discharge paddle connected to the shaft adapted to lift and discharge the fish through the discharge passage.

7. A fish washing tank as claimed in claim 6 in which the dscharge paddle is mounted on a pin rotatable with the shaft and extending axially from the shaft and having means to normally retain the said paddle positioned radially from the said shaft and a cam on the end of the tank to engage the edge of the said paddle and thereby tilt the paddle to discharge fish.

8. In a fish washing tank a tank, a discharge opening at one end of the tank, a shaft extending there through, a discharge paddle mounted on the shaft, said mounting comprising a hub attached to the shaft, a pin connected to the hub, a sleeve surrounding said pin and attached to the paddle, a coil spring tensioned between the hub and the sleeve and means to clamp the sleeve and paddle on the said pin.

9. In a fish washing machine as claimed in claim 8, having a stop pin mounted on the hub adapted to engage the paddle and retain it normally substantially radial to the said shaft.

10. In a fish washing machine as claimed in claim 8, having a cam on the end of the tank adjacent the discharge opening, said cam having an abrupt surface to tilt the paddle to discharge a fish and a graduated cam surface to allow returning the paddle to normal position under tension of the spring.

11. In a fish washing machine as claimed in claim 8, having a cam on the end of the tank adjacent the discharge opening, said cam having an abrupt surface to tilt the paddle to discharge a fish and a graduated cam surface to allow returning the paddle to normal position under tension of the spring and a pin mounted on the hub adapted to engage the paddle and retain it in normal position substantially in a plane, radial to the shaft.

In testimony whereof I affix my signature.

JOSEPH F. HIDZICK.